United States Patent
Wang et al.

(10) Patent No.: US 10,430,711 B2
(45) Date of Patent: Oct. 1, 2019

(54) METHOD AND SYSTEM FOR FUNC-BASED EXPERIENCE FRAMEWORK WITH CROSS-USER INTELLIGENCE

(71) Applicant: TCL RESEARCH AMERICA INC., San Jose, CA (US)

(72) Inventors: Haohong Wang, San Jose, CA (US); Yizhou Zang, San Jose, CA (US); Jianliang Yi, San Jose, CA (US); Ziju Feng, San Jose, CA (US); Lifan Guo, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 946 days.

(21) Appl. No.: 14/985,871

(22) Filed: Dec. 31, 2015

(65) Prior Publication Data
US 2017/0193370 A1 Jul. 6, 2017

(51) Int. Cl.
*G06N 5/02* (2006.01)
*H04L 29/08* (2006.01)

(52) U.S. Cl.
CPC ............. *G06N 5/025* (2013.01); *H04L 67/02* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 2003/0033432 A1* | 2/2003 | Simpson | H04L 29/06 709/246 |
| 2011/0078243 A1* | 3/2011 | Carpenter | G06F 17/246 709/204 |

\* cited by examiner

*Primary Examiner* — Shih-Wei Kraft
(74) *Attorney, Agent, or Firm* — Anova Law Group, PLLC

(57) ABSTRACT

A method is provided for providing desired application usage experience to a user on a user device. The method includes automatically converting a plurality of App pages into FUNC descriptors to be stored, wherein each FUNC descriptor includes at least non-functional properties of a FUNC, capability of the FUNC, and an interface of the FUNC to invoke the FUNC. The method also includes obtaining at least one user intention inputted by the user; determining at least one FUNC descriptor from the FUNC descriptors for fulfilling the user intention; recommending to the user with at least one FUNC corresponding to the at least one FUNC descriptor by rendering the at least one FUNC descriptor on the user device; and invoking the at least one FUNC directly from the user device without going through a launching page of an App page providing the at least one FUNC.

14 Claims, 8 Drawing Sheets

South Legend introduction: Chinese eatery with photography-decked walls specializing in creative eats from the Sichuan region.

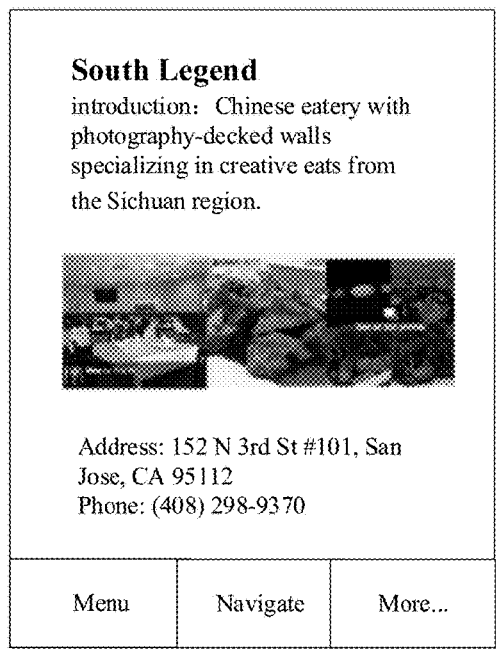

Address: 152 N 3rd St #101, San Jose, CA 95112
Phone: (408) 298-9370

| Menu | Navigate | More... |

Fig. 7A

South Legend introduction: Chinese eatery with photography-decked walls specializing in creative eats from the Sichuan region.

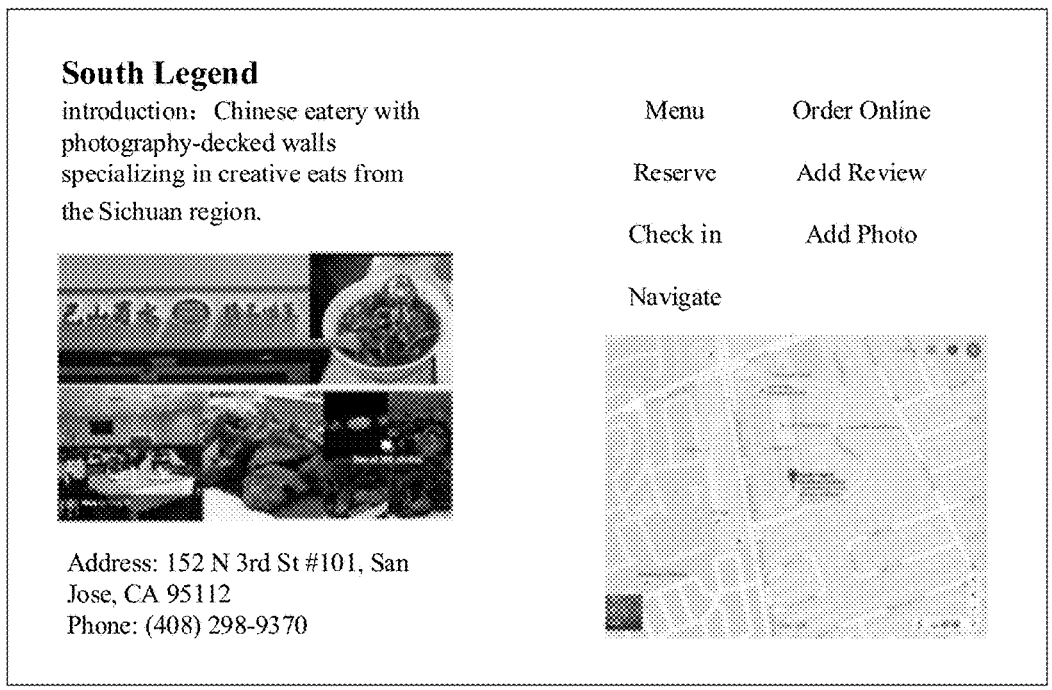

Address: 152 N 3rd St #101, San Jose, CA 95112
Phone: (408) 298-9370

Menu     Order Online

Reserve     Add Review

Check in     Add Photo

Navigate

Fig. 7B

METHOD AND SYSTEM FOR FUNC-BASED EXPERIENCE FRAMEWORK WITH CROSS-USER INTELLIGENCE

FIELD OF THE INVENTION

The present invention generally relates to the field of information technology and user interface technologies and, more particularly, to methods and systems for FUNC-based experience framework with cross-user intelligence.

BACKGROUND

Current mobile systems, whether based on ANDROID, IOS, WINDOWS, or others OS, often follow an App-driven usage model. That is, the user needs to know which App to use (assuming the application or App has been already installed on mobile device) before using it to achieve what the user wants. This may not fully align with the human being's natural logic and behavior model, which is an intention-driven usage model, that is, to let user interact with the device with his/her current intention (e.g., I am hungry, I am tired and so on). Such intention-driven usage model may work better as the user does not need to learn which App to do what or even does not need to know the concept of the App.

The disclosed methods and systems are directed to solve one or more problems set forth above and other problems.

BRIEF SUMMARY OF THE DISCLOSURE

One aspect of the present disclosure includes a method for providing desired application usage experience to a user on a user device. The method includes automatically converting a plurality of App pages into FUNC descriptors to be stored, wherein each FUNC descriptor includes at least non-functional properties of a FUNC, capability of the FUNC, and an interface of the FUNC to invoke the FUNC. The method also includes obtaining at least one user intention inputted by the user; determining at least one FUNC descriptor from the FUNC descriptors for fulfilling the user intention; recommending to the user with at least one FUNC corresponding to the at least one FUNC descriptor by rendering the at least one FUNC descriptor on the user device; and invoking the at least one FUNC directly from the user device without going through a launching page of an App page providing the at least one FUNC.

Another aspect of the present disclosure includes a system for providing desired application usage experience to a user on a user device. The system includes a FUNC descriptor module, a page-FUNC module, and a FUNC recommender. The page-FUNC module is configured to automatically convert a plurality of App pages into FUNC descriptors to be stored in the FUNC descriptor module, wherein each FUNC descriptor of an FUNC includes at least non-functional properties of the FUNC, capability of the FUNC, and an interface of the FUNC to invoke the FUNC. The FUNC recommender is configured to obtain at least one user intention inputted by the user; to determine at least one FUNC descriptor from the FUNC descriptors stored in the FUNC descriptor module for fulfilling the user intention; to recommend to the user with at least one FUNC corresponding to the at least one FUNC descriptor by rendering the at least one FUNC descriptor on the user device; and to invoke the at least one FUNC directly from the user device without going through a launching page of an App page providing the at least one FUNC.

Other aspects of the present disclosure can be understood by those skilled in the art in light of the description, the claims, and the drawings of the present disclosure.

BRIEF DESCRIPTION OF THE DRAWINGS

FIG. 7A illustrates an exemplary FUNC descriptor rendering after repurposing with device characteristics consistent with the disclosed embodiments;

FIG. 7B illustrates another exemplary FUNC descriptor rendering after repurposing with device characteristics consistent with the disclosed embodiments;

DETAILED DESCRIPTION

Figure 1:
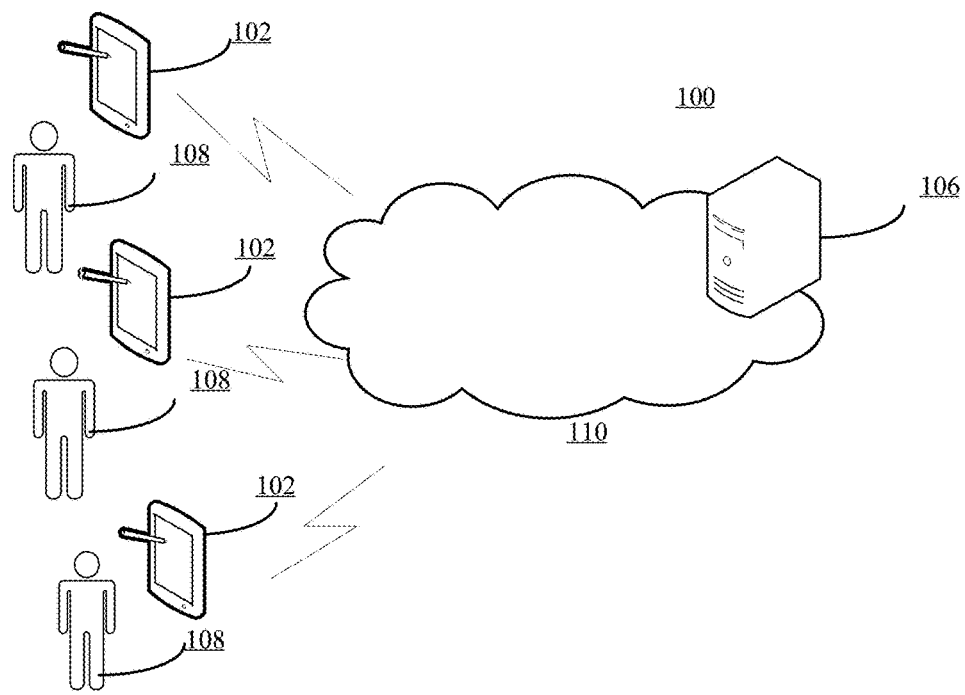
FIG. 1 illustrates an exemplary environment incorporating certain embodiments of the present invention.

Reference will now be made in detail to exemplary embodiments of the invention, which are illustrated in the accompanying drawings. Wherever possible, the same reference numbers will be used throughout the drawings to refer to the same or like parts.

To bridge a user's intention with services provided by a mobile device, e.g., bridge "I am hungry" with "finding a restaurant, booking a table, and getting there by UBER", the concept of function-level operation flow is introduced in the present disclosure. The term FUNC may reflect such function-level operation.

As used herein, the term "FUNC" or "func" may be used to represent an access point of an app, i.e., a function of an application or App. Each FUNC may be a function-level operation flow, which is associated with a function or service that satisfies a user's specific need. For a same need, different users may use different FUNCs in different mobile Apps according to the user's habits or preferences (for example, a user may use FACEBOOK to share a picture, and another user may use WECHAT for the same purpose). Because the FUNC provides an entrance to a native app, a web app, or a customized function, the FUNC may be used to make transition from one mobile App to the other mobile App to achieve a function sequence without going through the launching pages of the Apps.

Accordingly, the FUNC may be used to enable the services that cross the boundary of multiple mobile Apps. To be specific, a FUNC may be similar to a mobile deep linking, and may represent the entrance to functions on the mobile device or on web, in the following formats: (1) A shortcut to a page of a native mobile app, i.e., deep linking; (2) An entrance of a web App function; and (3) A customized function on the mobile device based on the cloud API service.

Thus, with a FUNC-based intention-driven usage model, the human-device interaction can be achieved by mapping a user's immediate needs to a sequence of FUNC flow, which renders the services that the user is expecting for the intention.

In addition, considering the rising trends of collaboration among people explicitly or implicitly (e.g., explicit collaboration via instant messengers, passive collaboration via Apps like GROUPON), the usage model that only involves user and his/her device may be insufficient, as other human beings' intelligence has not been incorporated into the system. For example, in today's system, when a manager's assistant using an App to buy manager an air ticket, when some sensitive information (e.g., the manager's frequent flyer number and password) is required, the ideal way is to pass the App page to the manager to fill and then pass the control back to the assistant.

In other words, the usage model that only uses FUNC concept to cross the boundaries of Apps for human-device interaction, which saves user's efforts to discover a FUNC (or App) that can satisfy the user's immediate needs, does not consider the human-human interaction via FUNC. Accordingly, an extended FUNC may be used to fully utilize the cross-user intelligence during the entire human-human and human-device interaction processes.

FIG. 1 illustrates an exemplary environment 100 incorporating certain embodiments of the present invention. As shown in FIG. 1, environment 100 may include a plurality of terminals 102, a server 106, a plurality of users 108, and a network 110.

A terminal 102 (also known as a terminal device) may refer to any appropriate user terminal with certain computing capabilities, such as a personal computer (PC), a work station computer, a server computer, a hand-held computing device (tablet), a smartphone or mobile phone, or any other user-side computing device. In certain embodiments, terminal 102 may be a mobile terminal device, such as a smartphone, a tablet computer, or a mobile phone, etc. Terminal 102 may be implemented on any appropriate computing platform.

The plurality of terminals 102 may be used by a plurality of users 108 to connect to network 110 and make requests to server 106. Each user 102 may use one or more terminals 102. As directed by the user 108, the terminal 102 may obtain webpages from any appropriate sources, such as from a local storage device, from a wired or wireless network device of a service provider, or from the Internet.

Further, the server 106 may refer to one or more server computers configured to provide certain web server functionalities (e.g., search server). The server 106 may include one or more processors to execute computer programs in parallel. The server 106 may store webpages to be accessed by terminals, and each of these webpages has a unique web address. The unique web address is also called Uniform Resource Locator (URL). The server 106 may also provide various Apps to the terminal 102 as requested by the user 108 and/or may make various recommendations to the user about the web pages and/or Apps and App functions. The server 106 may also be a cloud server.

Terminals 102 and server 106 may communicate with each other through communication network 110, such as a cable network, a phone network, and/or a satellite network, etc. Although three terminals 102 and one server 106 are shown in FIG. 1, any number of terminals and/or network devices may be included.

Figure 2:
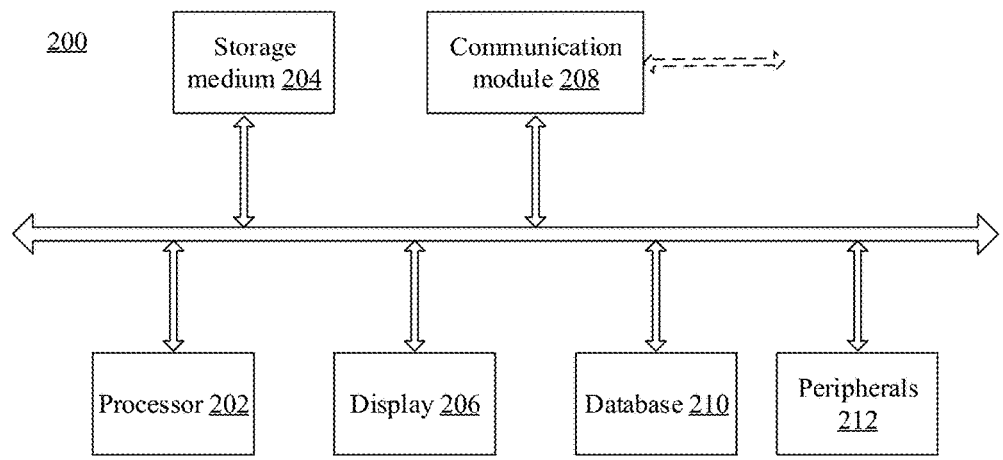
FIG. 2 illustrates an exemplary computing system consistent with the disclosed embodiments.

Terminal 102, and/or server 106 may be implemented on any appropriate computing circuitry platform. FIG. 2 shows a block diagram of an exemplary computing system 200 capable of implementing terminal 102, and/or server 106.

As shown in FIG. 2, computing system 200 may include a processor 202, a storage medium 204, a display 206, a communication module 208, a database 210, and peripherals 212. Certain devices may be omitted and other devices may be included.

Processor 202 may include any appropriate hardware processor or processors. Further, processor 202 can include multiple cores for multi-thread or parallel processing. Storage medium 204 may include memory modules, such as ROM, RAM, flash memory modules, and mass storages, such as CD-ROM and hard disk, etc. Storage medium 204 may store computer programs for implementing various processes, when the computer programs are executed by processor 202.

Further, peripherals 212 may include various sensors and other I/O devices, such as keyboard and mouse, and communication module 208 may include certain network interface devices for establishing connections through communication networks. Database 210 may include one or more databases for storing certain data and for performing certain operations on the stored data, such as database searching.

In operation, user 108 may, through terminal 102 or a web browser on terminal 102, intend to use certain applications (apps) or mobile Apps available on the terminal 102 or online from various servers 106. A mobile App may have a home page or other direct access point that may be used to achieve a certain function. The mobile App access point may include an entrance to the function on the mobile device or web, a type of the function, and other relevant information, such as location, status, and nature of the function, etc. The function may include a native mobile app, a web app, and a customized function as a cloud application programming interface (API).

A native mobile App may refer to a mobile device application that is coded in a specific programming language for a particular operating system. The native mobile App is installed directly on a mobile device. A web App may refer to a website that is tailored to function via a web browser on a mobile device. The entrance to function and the type of the entrance may include a variety of configurations.

For example, an access point may include a link to a web App page, a link to a customized function, a link or shortcut to an installed native App page, a link to a page of a compressed version of a native app, a link to the action of native App download and installation, and a link to an App guideline page that suggests the user to open an alternative app, etc. Based on the FUNC concept, a functional flow of user's action can be built up more smoothly without using the App-level operations. The App-level operations refer to certain operations that are performed among multiple mobile apps or web services by frequently using the home page, and thus more user interactions (screen touches or key presses) may be required and it may be more difficult to implement a function sequence.

Figure 3:
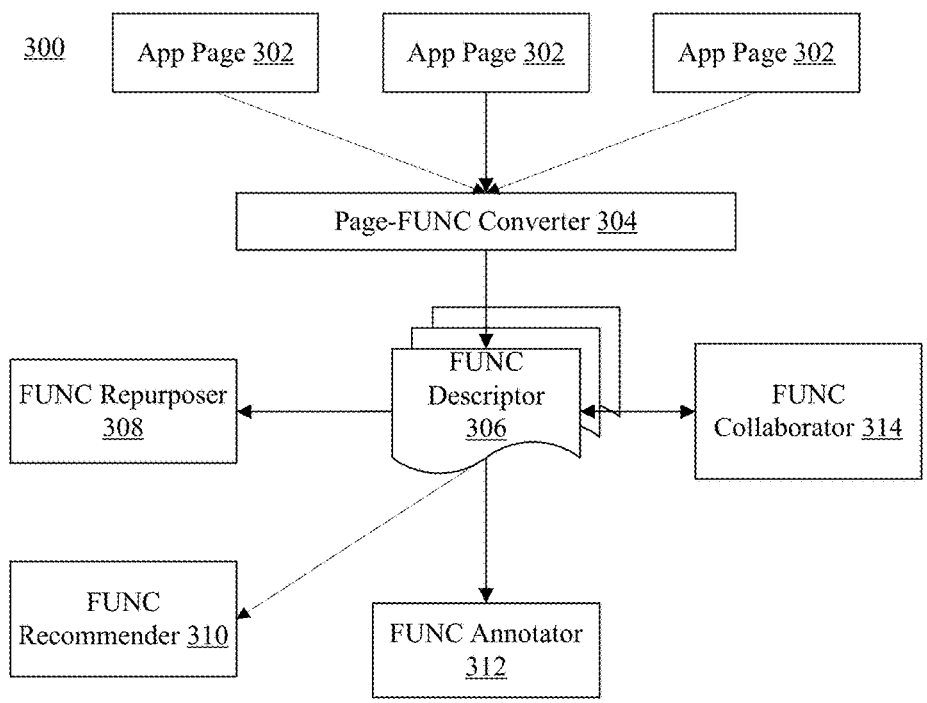
FIG. 3 illustrates a structure schematic diagram of an exemplary FUNC system consistent with the disclosed embodiments.

Further, server 106 (a FUNC server) may provide a FUNC-based multiple-user interaction system (a FUNC system) for applying a new user experience model, a FUNC-based experience model that combines App knowledge and human intelligence. FIG. 3 illustrates an exemplary FUNC-based multiple-user interaction system 300.

As shown in FIG. 3, the FUNC system 300 may include a plurality of App pages 302, a page-FUNC converter 304, a FUNC descriptor module 306, a FUNC repurposer 308, a FUNC recommender 310, a FUNC annotator 312, and a FUNC collaborator 314. Certain components may omitted and other components may be added.

The plurality of App pages 302 may include any appropriate App pages providing application functionalities or functions to users. The page-FUNC converter 304 may convert an App page into one or more FUNC descriptors, which are stored and managed by the FUNC descriptor module 306.

The FUNC descriptor module 306 may include a database storing a plurality of FUNC descriptors. A FUNC descriptor may represent a particular FUNC and may include a set of structured data that describes attributes constituting a FUNC. For example, the FUNC descriptor of a particular FUNC "South Legend Sichuan Restaurant", which is converted from a YELP app, can be represented partially as in Table 1 below.

TABLE 1

Partial representation of an exemplary FUNC Descriptor

| Attribute | Value |
| --- | --- |
| Name (String) | South Legend Sichuan Restaurant |
| Introduction (String) | Chinese eatery with photography-decked walls specializing in creative eats from the Sichuan region. |
| Address (String) | 1720 N Milpitas Blvd, Milpitas, CA 95035 |
| Phone (phone#) | (408) 934-3970 |
| SourceURL | http://www.yelp.com/biz/south-legend-sichuan-restaurant-milpitas |
| Pictures | http://FUNC-based-system/photos/south-legend-sichuan-restaurant-milpitas |
| Reserve | http://FUNC-based-system/funcs/RestaurantReserve |
| . . . | . . . |

As shown in Table 1, a FUNC descriptor may contain two structured parts, various attributes and their corresponding values. Using such structured data, an App page to FUNC converter can be provided to support automatic conversion from an App page to a FUNC descriptor. As shown in FIG. 3, the page-FUNC converter 304 may be configured to automatically convert an App page to one or more FUNC descriptors.

Figure 4:
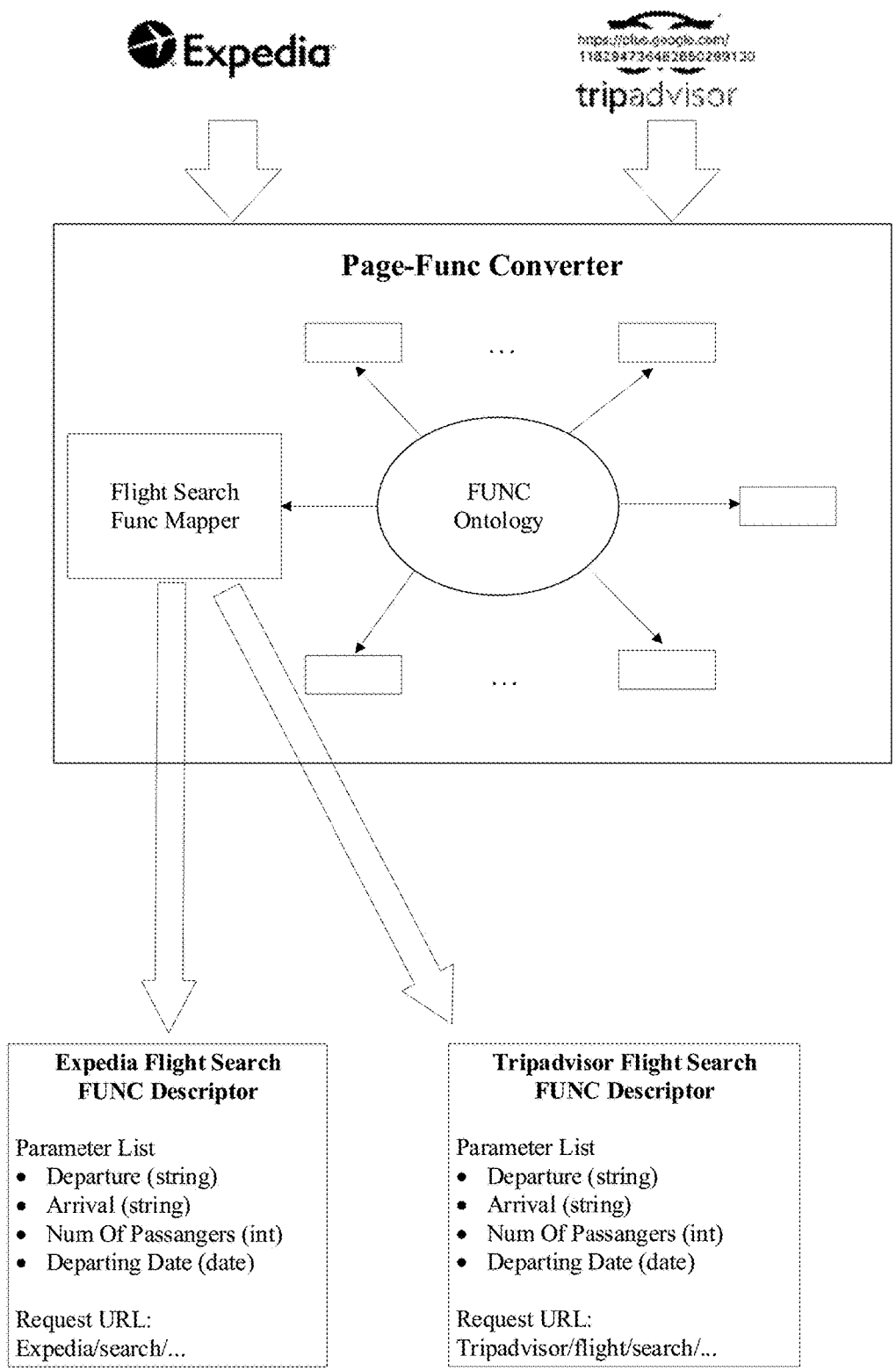
FIG. 4 illustrates an exemplary FUNC descriptor conversion consistent with the disclosed embodiments.

To provide automatic conversion of an App page to a FUNC descriptor, the page-FUNC Converter 304 may include a FUNC ontology module (FO), which specifies formal naming and definition of shared conceptualization related to the concept of FUNC. That is, based on the FO, domain-specific FUNC mapping may be developed to specify attributes of FUNC descriptors in one domain by a FUNC mapper. FIG. 4 illustrates an exemplary FUNC converter with an FO and a FUNC mapper.

As shown in FIG. 4, a FUNC mapper called "Flight Search FUNC Mapper" is demonstrated. This FUNC mapper specifies common attributes, such as Request URL, of a bunch of flight search functions in existing apps. Thus, Apps providing flight search function, such as EXPEDIA and TRIPADVISOR, can choose to use this FUNC mapper to convert their App pages to FUNC descriptors automatically.

An ontology is a formal naming and definition of shared conceptualization in a particular domain of discourse. A FUNC ontology may specify essential components of the key concept of FUNC, may also be the foundation of building multiple FUNC mappers that can help developers convert their app/web pages into FUNC descriptors.

In order to define an FO, which is meant to be a meta-model for functionalities in App and web, in the following definitions, a Meta Object Facility (MOF), a specification that defines an abstract language and a framework for technology-neutral meta-models, may be used. Specifically, in the definition of the FO, the most used MOF meta-modeling construct is the Class construct (and implicitly its class-generalization sub-Class construct), together with its Attributes, the type of the Attributes and their multiplicity specifications.

For example, a FUNC represents the entrance to mobile App functionalities and web services may be defined as follows:

| FUNC Definition |
| --- |
| Class FUNC |
|     hasNonFunctionalProperties type nonFunctionalProperties |
|     hasCapability type capability multiplicity = single-valued |
|     hasInterface type interface |

In this definition, FUNC consists of three parts: Non-Functional Properties, Capability and Interface.

Non-Functional Properties define elemental information of a FUNC that contains no function-level description. The non-functional properties recommended are: Accuracy, Contributor, Coverage, Creator, Date, Description, Financial, Format, Identifier, Language, Network-related QoS, Owner, Performance, Publisher, Relation, Reliability, Rights, Robustness, Scalability, Security, Source, Subject, Title, Transactional, Trust, Type, Version.

A Capability defines the FUNC by means of its functionality.

| Capability Definition |
| --- |
| Class Capability |
|     hasSharedVariables type sharedVariables |
|     hasPrecondition type axiom |
|     hasAssumption type axiom |
|     hasPostcondition type axiom |
|     hasEffect type axiom |

In the definition above, Capability consists of five parts: SharedVariables, Precondition, Assumption, Postcondition and Effect.

Shared Variables represent the variables that are shared among preconditions, postconditions, assumptions and effects. They are all quantified variables in the formula that concatenates assumptions, preconditions, postconditions, and effects.

For example, If the axiom $v1, \ldots, vn$ are the shared variables defined in a capability, and $pre(v1, \ldots, vn)$, $ass(v1, \ldots, vn)$, $post(v1, \ldots, vn)$, and $eff(v1, \ldots, vn)$ are used to denote the formula defined by the preconditions, assumptions, postconditions, and effects, respectively, then the following holds: for All $v1, \ldots, vn$, $pre(v1, \ldots, vn)$ and $ass(v1, \ldots, vn)$ implies $post(v1, \ldots, vn)$ and $eff(v1, \ldots, vn)$.

Preconditions describe the information space of FUNC before its execution.

Assumptions specify the global state before the execution of FUNC.

Preconditions describe the information space of FUNC after its execution.

Effects specify the global state after the execution of FUNC.

Further, with respect to the FUNC Definition, an interface describes how the functionality of the FUNC can be obtained. That is, the interface can be used to invoke the FUNC directly without going through the launching page of the App providing the corresponding function.

| Interface Definition |
| --- |
| Class Interface<br>    hasCommunication type communication<br>    hasCooperation type cooperation |

Communication specifies the necessary information to achieve FUNC, like the interaction protocol for accessing a web service.

Cooperation specifies how the current FUNC makes use of other FUNCs to obtain its capability.

Further, after a FUNC descriptor is generated, certain operations may be performed on the FUNC descriptor or the FUNC. For example, operations of 'editing', 'sharing', and 'annotating' may be performed on a FUNC descriptor or FUNC.

With the editing operation, users can edit the attributes of FUNC descriptors. For example, in a flight booking FUNC, the default value of textbox for passenger's DOB is both "null". When a copy of this FUNC descriptor is sent to users, the users are allowed to change the value of the textbox on the FUNC replica.

With the sharing operation, the edited FUNC descriptor mentioned the above example can be shared to other users. In this example, if one user entered his DOB and shared it with another user, the receiver would see the sender's DOB already filled. Such data and status sharing make collaborations on a FUNC possible. Further, with the annotating operation, users can comment, highlight and even doodle on FUNC descriptors.

Returning to FIG. 3, using the above concepts and formats, the page-FUNC converter 304 may be configured to convert App page data into the FUNC descriptor format. This enables a common format of the FUNCs in the system that indirectly achieves the sharing and collaborative editing functions of the FUNCs.

Further, the FUNC recommender 310 may be configured to, when a user's immediate intention is obtained (either implicitly or explicitly) via, for example, a voice input or a keyboard, touch screen, or gesture input, determine at least one FUNC that best matches user's expectation to recommend. The FUNC recommender 310 may recommend to the user with the at least one FUNC (corresponding to the at least one FUNC descriptor) by rendering the at least one FUNC descriptor on the user device. The user may select the FUNC to be invoked, and the FUNC recommender 310 may invoke the selected FUNC directly from the user device without going through a launching page of an App page providing the selected FUNC.

Further, during the recommendation process, after a FUNC is selected to be recommended to user, the FUNC repurposer 308 may be configured to repurpose the look and feel of the selected FUNC to match the user's preference and the device currently in use. For example, the layout of the FUNC may be different for a smart phone or for a tablet, or the style of the FUNC may change across various people.

Figure 5:
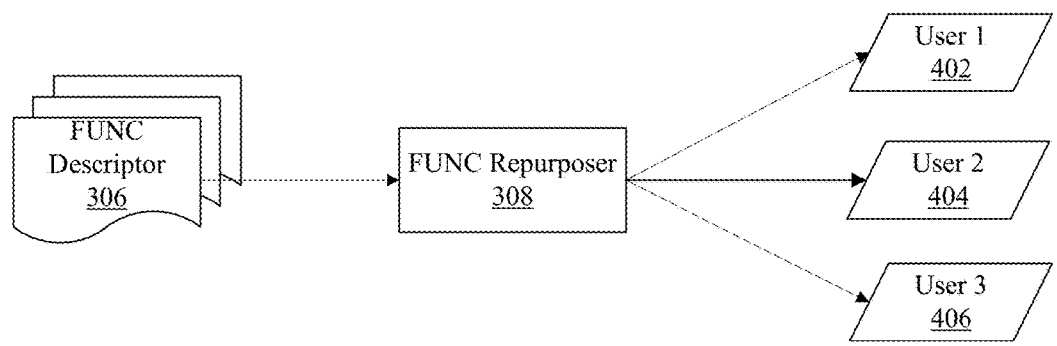
FIG. 5 illustrates an exemplary FUNC repurposing operation consistent with the disclosed embodiments.

More specifically, the FUNC repurposer 308 may represent FUNC in most appropriate way to match different user preferences and device characteristics. As shown in FIG. 5, if multiple users (User1, 2, 3) 402, 404, and 406 request a same particular FUNC (FUNC f), the FUNC repurposer 308 may take the original FUNC descriptor 306 as input, and outputs repurposed FUNCs with different rendering specifications, which can generate optimal representations for each user 402, 404, or 406.

Two factors may be taken into account in the repurposing process: user preferences and current device in use (i.e., device characteristics). Users with different needs or habits may disagree on the "best" rendering. Thus, the representation style of FUNC may change across different users.

Figure 6A:
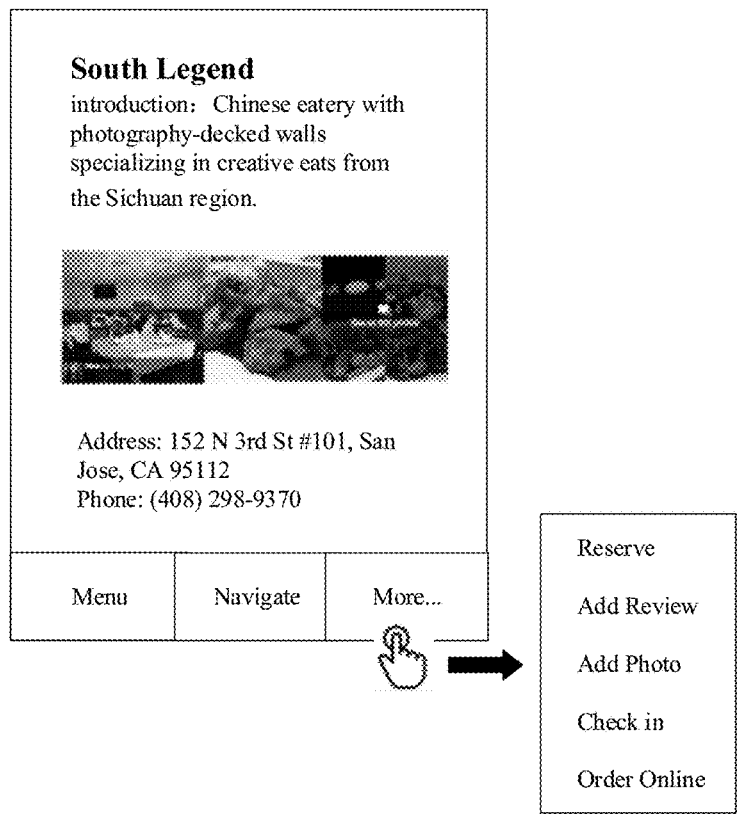
FIG. 6A illustrates an exemplary FUNC descriptor rendering consistent with the disclosed embodiments.
Figure 6B:
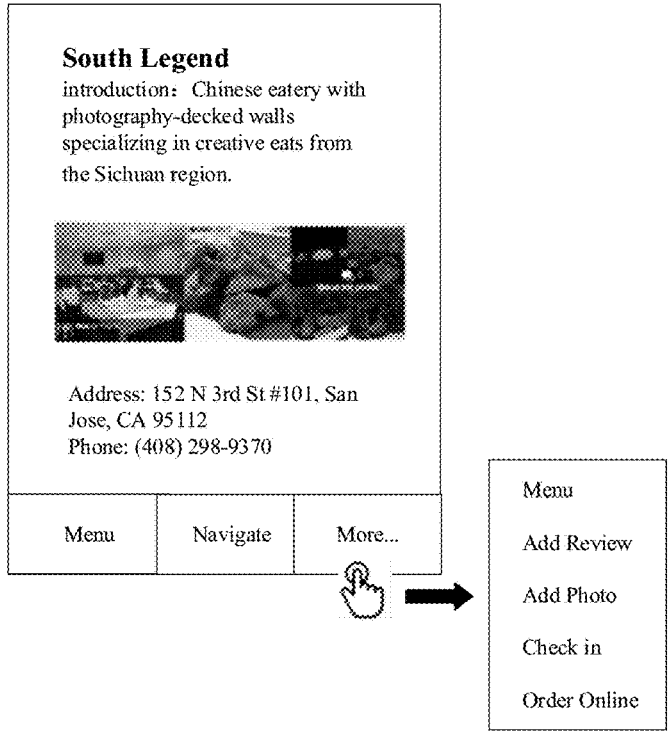
FIG. 6B illustrates an exemplary FUNC descriptor rendering after repurposing consistent with the disclosed embodiments.

For example, as shown in FIG. 6A, a specific restaurant FUNC "South Legend" is rendered. A regular customer of this restaurant might frequently manipulate the "More . . . " drop-down menu and use the inside "Reserve" function. In this case, for a non-regular user of the system, the rendering of the FUNC "south Legend" may be adjusted by changing the position of the "Reserve" button with the "Menu" button and hiding the "Reserve" button, as shown in FIG. 6B. The customized interface rendering factors in the user preference can hide those buttons that are seldom manipulated while add buttons that are likely used.

Further, different devices may have different constraints such as screen sizes and display resolutions. Therefore, adaptive renderings are needed to fit the characteristics of different devices. For example, when rendering the same restaurant FUNC in the example above on both a smart phone and a tablet, different device display size may be considered.

FIG. 6A shows a default looking of the FUNC "South Legend" rendered on a smart phone. However, such layout is apparently not suitable for a tablet with larger screen. FIG. 7A shows the FUNC "South Legend" rendered on a tablet without FUNC repurposing. FIG. 7B shows a repurposed FUNC "South Legend" rendered on the tablet screen. As shown in FIG. 7B, the FUNC makes better use of available room on tablet screen, and the elements on FUNC are rearranged so that various benefits can be achieved. For example, all the function buttons can be placed on surface instead of "hiding" inside a drop-down menu, more photos can be shown, a larger font size is applied, and a thumbnail of the map is also added, etc.

To achieve such adaptive representation, an algorithm may be used to establish a model as the underlying mechanism for the adaptive representation. The algorithm may be based on the concept of "estimated effort", denoted as EST. EST is an estimation of the effort that the user makes to use a FUNC, and EST can be used to measure the optimal level of a rendering.

More specifically, EST may consist of two factors, Match cost (M) and Navigational cost (N). M and N are a pair of contradictory factors that reflect different estimated user efforts associated with consuming a FUNC element in a widget. M is a device-specific matching function that measures how appropriate each widget is for consuming the information of the element, while N is a function that estimates the extra user effort required to manipulate the widget.

Figure 8A:
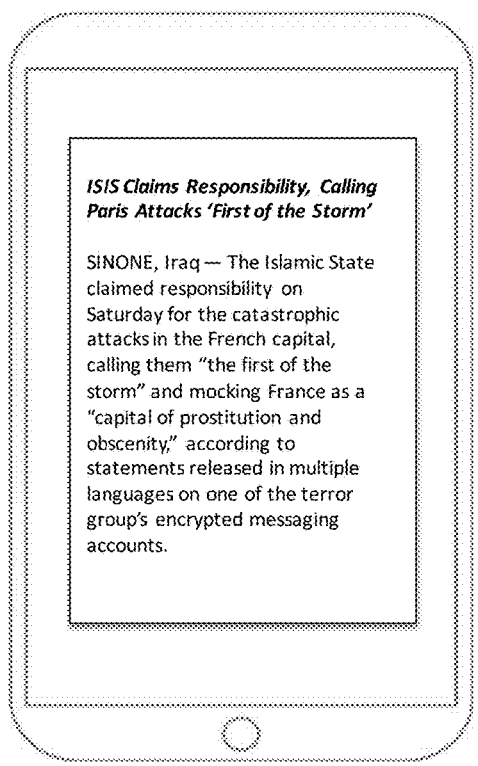
FIG. 8A illustrates an exemplary FUNC descriptor rendering in one page consistent with the disclosed embodiments.
Figure 8B:
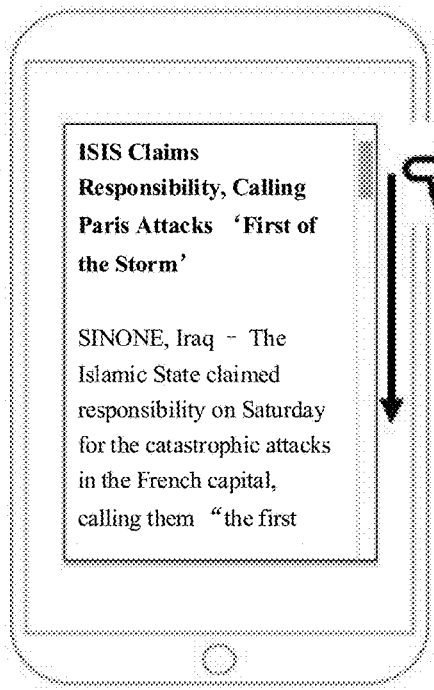
FIGS. 8B-8C illustrate an exemplary FUNC descriptor rendering in two pages consistent with the disclosed embodiments.
Figure 8C:
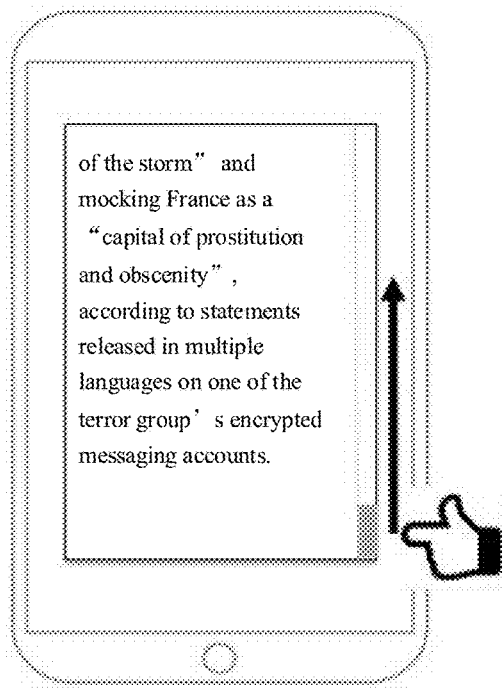

For example, a long passage (which is a FUNC element) needs to be fit into a text box. If a small font size is chosen, the whole passage can be shown in one page, but the tradeoff is low readability, as shown in FIG. 8A. In contrast, if a larger font size is chosen, the passage will be shown in two pages, as shown in FIG. 8B and FIG. 8C. The consequence is a higher readability, but the user needs to pay extract effort for scrolling down the screen to see the second page in FIG. 8C.

Thus, EST can be factored in a specific way:

$$EST(R(F), DU) = \sum_{e \in F} M(R(e), D, U) + N(R(e), D, U)$$

This equation states that EST of a rendering (R) of a FUNC (F), is the trader off of two factors, the match cost (M) and navigational cost (N) of using this rendering, given a device (D) and a user (U).

Thus, the goal is to find the optimal rendering R that minimizes the EST value. This is an optimization problem, of which the solution can be briefly described as follows.

Device modeling may be used to specify devices. The device D may be modeled as a tuple:

$$D = <W, CT_D>$$

where W is the set of available UI widgets and $CT_D$ refers to a set of device-specific constraints. Widgets are objects that can turn abstract FUNC elements into components of a rendered interface. Different widgets libraries may be provided for different kinds of devices. For example, multi-column view widget is included for tablet but not for smart phone with small screen size. Device-specific constraints ($CT_D$) are specifications of a device. For example, a constraint is used to reflect the available screen size.

Further, user modeling may be used to specify users. Users with different needs or habits may disagree on the "best" rendering. Therefore, a user model may be provided to consider usage pattern differences. A set of user trails may be used to denote usage histories. Each trail represents one usage of a FUNC. Each trail consists of a sequence of actions a, performed on the FUNC. Each action is defined as a tuple $<e_i, v_{oi}, v_{ni}>$, in which $e_i$ is a FUNC element manipulated, $v_{oi}$ denotes the old value of $e_i$, and $v_{ni}$ denotes the new value of $e_i$. As the trails information accumulates, it can be used to render the interface adapting it to the preference of a particular user.

As mentioned, EST is used to measure the optimization degree of the rendered interface. The goal of the FUNC repurposer is to find the mapping function R: E→W, which can minimize the cost function EST(R(F), D, U). R is then the optimized format specification used to render the interface of FUNC F. Any appropriate optimization algorithms may be used.

Returning to FIG. 3, the FUNC annotator 312 may be configured to manage additional annotation in the format of audio, visual, text and so on, on top of the original FUNC descriptor. This way, a user can share a FUNC to another user with his/her own comments/annotation message. Sometimes this function may be important in instant messaging applications.

Figure 9:
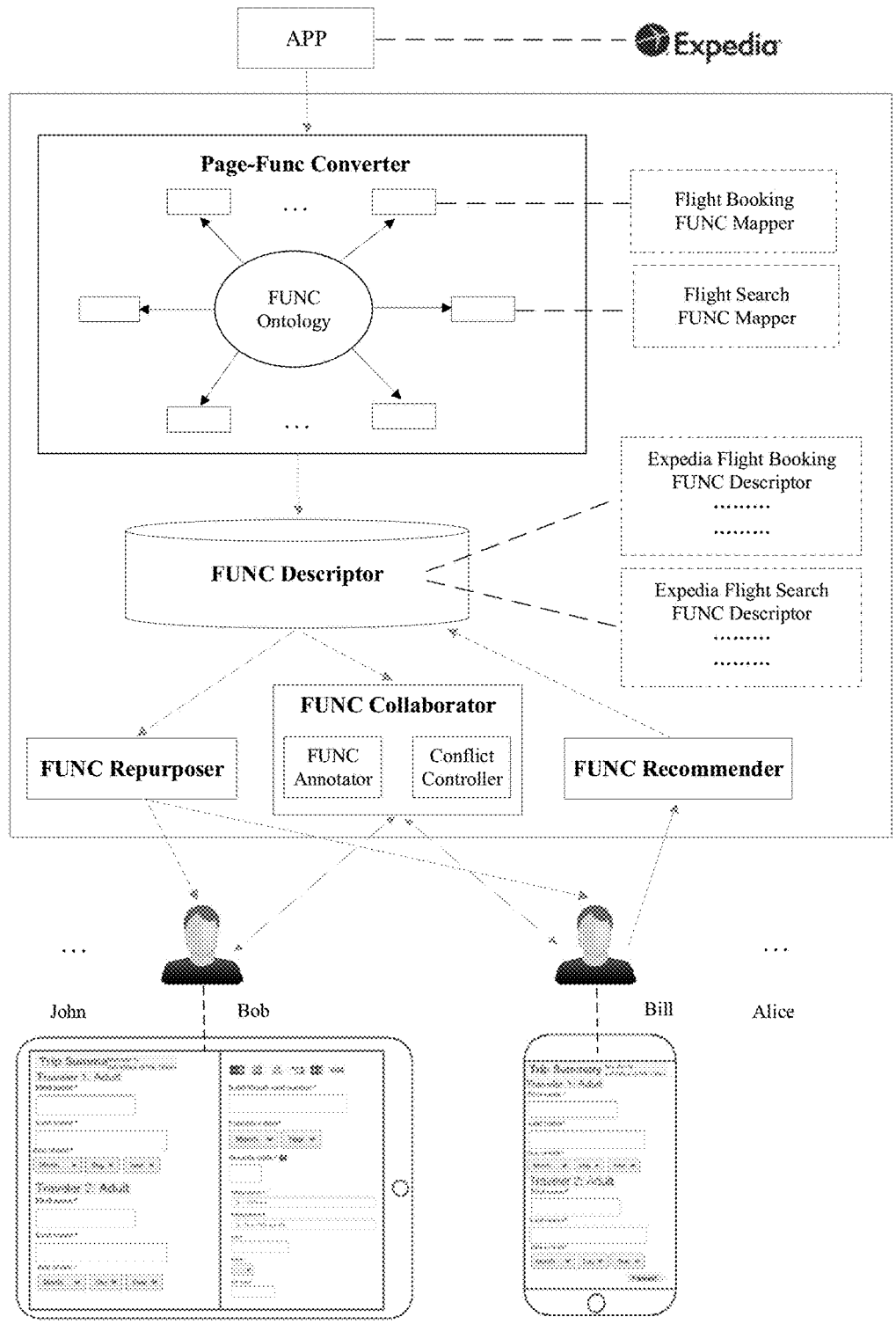
FIG. 9 illustrates an exemplary FUNC operation usage scenario consistent with the disclosed embodiments.

Further, the FUNC collaborator 314 may be configured to enable a single FUNC being operated by multiple users simultaneously. The FUNC collaborator 314 may receive a request from the user for a collaboration session to enable other users to operate on the FUNC descriptor jointly. The FUNC collaborator 314 may make a copy of the FUNC descriptor for each user included in the collaboration session; and may synchronize the copy of the FUNC descriptor for each user to reflect all operations made by all users in the collaboration session. Thus, multiple copies of the FUNC descriptor may be generated and managed, and the resource contention issues need to be avoided. With this collaboration mechanism, cross-user intelligence may be leveraged into the system to improve the user experience. FIG. 9 illustrates a user collaboration scenario of the FUNC system consistent with the disclosed embodiments.

As shown in FIG. 9, a group-ticket-booking scenario is used as an example, in which a group of friends are planning a trip. A group of users (e.g., John, Bob, Bill, Alice, etc.) may be planning a trip together. The organizer Bill finds a cheap flight deal. The deal offers a big discount for group purchase. Therefore, Bill tells his friends he can buy tickets for them. However, when the passengers' info (e.g., date of birth and frequent flyer number) is required, the ideal way is to pass the booking page to others to fill by themselves and then pass the control back to Bill to finish the booking.

Unlike the existing mobile systems, where a travel App providing ticket-search and booking functions must be chosen by user, i.e., Bill, the FUNC recommender 310 can recommend appropriate FUNCs to Bill directly in accordance with his intention. The FUNCs can be created by automatic conversion of apps, i.e., by applying the FUNC ontology model. For example, in this scenario, it may be assumed that the recommended two FUNCs are converted from Expedia app, an "EXPEDIA Flight Search" FUNC and an "EXPEDIA Flight Booking" FUNC.

After the two FUNC descriptors of the "EXPEDIA Flight Search" FUNC and the "EXPEDIA Flight Booking" FUNC are created, before the copies of the two FUNC descriptors are sent to Bill, the FUNC repurposer 308 may add rendering specifications to the original FUNC descriptors, based on Bill's user preference and the characteristics of device that bill is using. Afterwards, the two FUNCs are successfully transmitted to Bill's device and is ready for use.

Bill may first use the "EXPEDIA Flight Search" FUNC for finding cheap flights. Once Bill finishes the searching and selects one flight to buy, he is directed to the corresponding "EXPEDIA Flight Booking" FUNC. Then, he may be asked to fill other passengers' information, which Bill does not know. Thus, Bill sends a request to the FUNC collaborator 314 to create a collaboration session.

After receiving the request, the FUNC Collaborator 314 may send a copy of the shared FUNC descriptor to each participating user (e.g., Bob, John and Alice, etc.). Each participating user is allowed to operate on the shared FUNC descriptor, such as editing and annotating. The FUNC collaborator 314 ensures synchronized view on each device by transferring the changed state of the FUNC descriptor on one device to others.

For example, when Bill enters "01/01/1980" into the DOB textbox, the state of that textbox changes from "null" to "01/01/1980". This change is sent to the FUNC collaborator 314 and the state of that textbox on other local replica are changed as well. In this way, the views on each device are synchronized. The FUNC collaborator 314 also supports annotating on FUNCs. For example, Bill may want to remind others so that he can add an annotation on any part of the FUNC descriptor. The annotation is also updated to each other device.

Further, to avoid potential concurrent update issues for such "real-time operation" feature, a locking mechanism may be provided. For example, if Bill is entering his DOB, the manipulated object may be locked, so that other users can no longer manipulate the same object. Once all the users finish the filling, Bill can further enter payment information and finish the booking. Thus, the collaboration issue can be solved.

Figure 10:
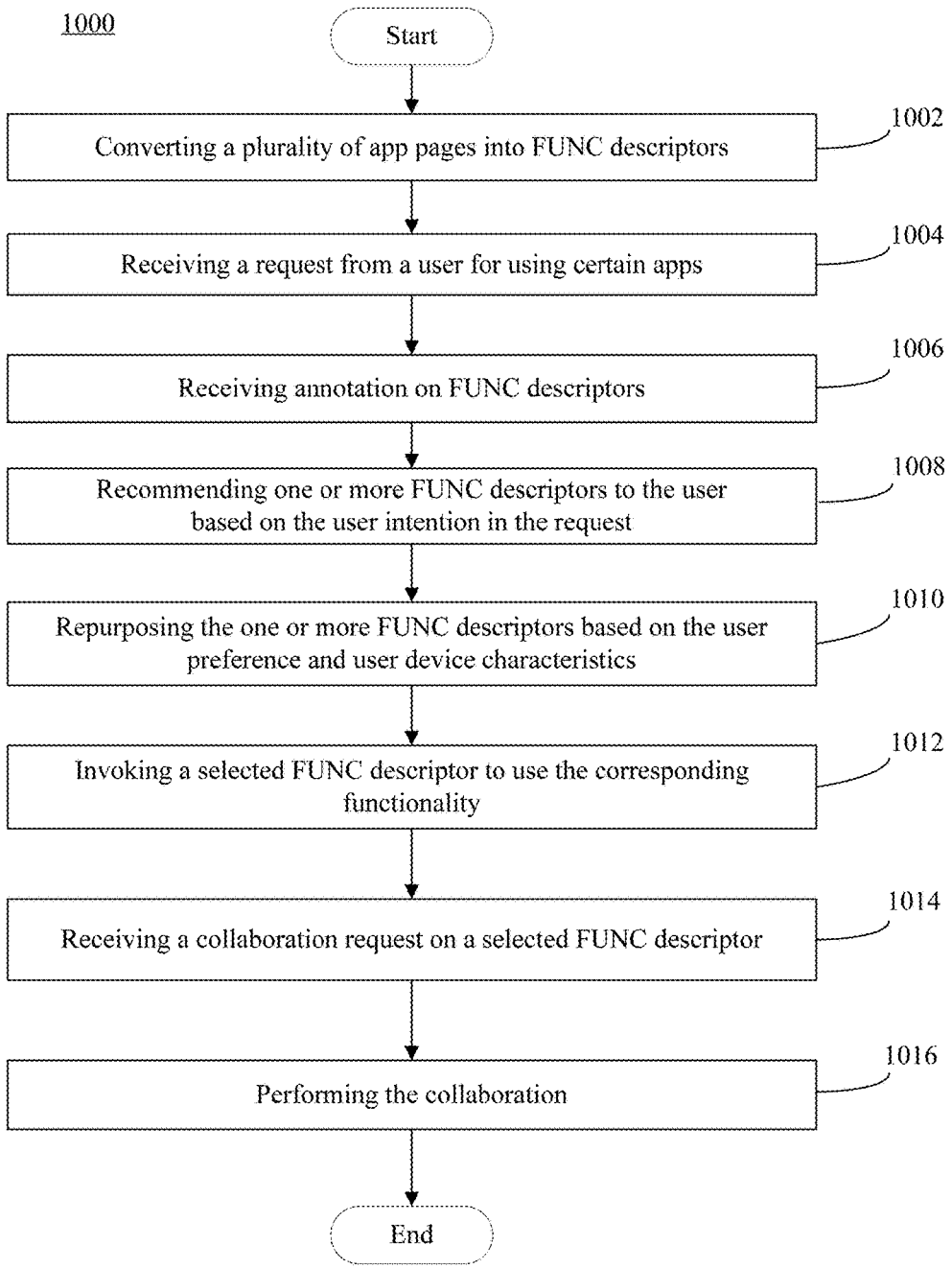
FIG. 10 illustrates an exemplary FUNC operations process consistent with the disclosed embodiments.

FIG. 10 illustrates an exemplary FUNC operation process based on the user-interaction system 300 shown in FIG. 3. As shown in FIG. 10, at the beginning of the operation process, a plurality of App pages may be converted into FUNC descriptors (1002). The converted FUNC descriptors may be stored in a database for future operation. In certain embodiments, the App pages may also be converted into FUNC descriptors in real-time, after a user expressed the intention for certain Apps. Further, the FUNC descriptors may be in a default format. That is, the FUNC descriptors may be in a format for a default user and a default device, or without any modification from the App page.

Further, a request from a user for using certain Apps may be received (1004). The user may explicitly or implicitly express an intention for using certain apps, and the user device may send the request including the user intention to the FUNC server for processing. Further, the request may also include device information or device characteristics of the user device and/or the user preference. The FUNC server may also store user preference and/or device characteristics of existing users, or may ask the user for such information in real-time. If there are other users, any user may also annotate the FUNC descriptors, and the annotation may also be received and stored with the FUNC descriptors (1006).

Further, based on the user intention in the request, one or more FUNC descriptors may be recommended to the user (1008). That is, copies of the one or more FUNC descriptors matching the user intention may be sent to the user device for the user to select and use.

In addition, the FUNC descriptors sent to the user may be repurposed first based on the user preference and/or the user device characteristics such that the rendering of the FUNC to be displayed to the user can fit the user preference and the user device (1010). If there is any annotation, the annotation may also be rendered to be displayed to the user.

The user may select a particular FUNC and invoke the FUNC directly without going through the corresponding App page (1012). Because the FUNC is an entrance to the function provided by the corresponding App page, the user can directly invoke the FUNC to access the function provided by the corresponding App page without the need to go to individual App page.

Further, the user may need other user's collaboration to complete a particular FUNC, and a request for a collaboration session may be sent to the FUNC server (1014). The collaboration request may identify other users required for the collaboration and/or the object/item needs the collaboration. For example, the user may select from a contact list of a social network or of an email system a plurality of friends or other users to be added in the collaboration request.

After receiving the collaboration request from the user (i.e., the first user), the FUNC server may send each user required for collaboration a copy of the shared FUNC descriptor in collaboration with any operation performed by any other user (1016). That is, the FUNC server ensures all the users in collaboration have the most updated version of the FUNC descriptor, such that the first user can have all updates from other users and determine whether the collaboration is successful. When the first user determines that the collaboration is complete, the user may continue the FUNC previously invoked and may also notify the FUNC server the completion of the collaboration such that the FUNC server can close the collaboration session.

By using the disclosed methods and systems, various applications can be implemented based on FUNC descriptors and associated operations to enable the automatic conversion of a web App page to the FUNC descriptor, and also enable the App developers to link the App page with the FUNC system. For example, a new usage model that is based on FUNC descriptor and associated operations, FUNC repurposing model, and multi-user FUNC collaborative model can be realized, fully utilizing the cross-human intelligence during the human-human and human-device interaction process.

The user does not need to know which App to use but to tell the device his/her current intension or choose a friend in the contact list to communicate; the FUNC is the basic unit the user is using to communicate with the device as well as his/her friends. The disclosed system can automatically convert an App page into a FUNC descriptor, which can be edited, extended, or repurposed for various usage scenarios, and the disclosed system renders the FUNC descriptor into personalized style that can fit into the user's preferences and devices the best. On the other hand, the disclosed system enables multiple users' simultaneous operation on a FUNC descriptor in a collaborative manner.

With the FUNC, the functional flow of user's action can be built up much more smoothly without using the app-level operations. That is, the user may use FUNC-level operations instead to cross multiple apps or web services. When the user finishes the current FUNC operation, the potential next steps will be recommended to user in the format of FUNCs. Data transferring among FUNCs is also supported to make the user experience easier, that is, some information used in the previous FUNC will be arranged in place for the current FUNC usage, so that the user does not need to input the information again for the current FUNC.

Other steps may be referred to above descriptions with respect to the system for scalable user intent mining. Other applications, advantages, alternations, modifications, or equivalents to the disclosed embodiments are obvious to those skilled in the art.

What is claimed is:

1. A method for providing desired application usage experience to a user on a user device, comprising:
  automatically converting a plurality of App pages into FUNC descriptors to be stored, wherein each FUNC descriptor includes at least non-functional properties of a FUNC, capability of the FUNC, and an interface of the FUNC to invoke the FUNC;
  obtaining at least one user intention inputted by the user;
  determining at least one FUNC descriptor from the FUNC descriptors for fulfilling the user intention;
  recommending to the user with at least one FUNC corresponding to the at least one FUNC descriptor by rendering the at least one FUNC descriptor on the user device;
  invoking the at least one FUNC directly from the user device without going through a launching page of an App page providing the at least one FUNC;
  repurposing the at least one FUNC descriptor based on preference of the user and characteristics of the user device; and
  rendering the at least one FUNC descriptor on the user device based on the repurposing of the at least one FUNC descriptor, comprising:
    using an estimation (EST) of effort that the user makes to use the at least one FUNC to establish an underlying mechanism for the repurposing, wherein:

$$EST(R(F), DU) = \sum_{e \in F} M(R(e), D, U) + N(R(e), D, U)$$

wherein M is a match cost that measures how appropriate each widget is for consuming an information of a FUNC element, N is a navigational cost that estimates an extra user effort required to manipulate the widget, F is the FUNC element, R is a rendering of the FUNC element (F) and is a trader off of two factors, M and N of using the rendering, giving a device (D) and a user (U).

2. The method according to claim 1, wherein the repurposing is performed based on an estimation of effort that the user makes to use the FUNC including a match cost and a navigational cost.

3. The method according to claim 1, wherein:
the capability includes at least one or more of shared variables, pre-condition, assumption, postcondition, and effect.

4. The method according to claim 1, wherein:
the interface includes communication information to realize one or more FUNCs corresponding to the FUNC descriptor and cooperation with other FUNCs.

5. The method according to claim 1, further including:
receiving a request from the user for a collaboration session to enable other users to operate on the FUNC descriptor jointly;
making a copy of the FUNC descriptor for each user included in the collaboration session; and
synchronizing the copy of the FUNC descriptor for each user to reflect all operations made by all users in the collaboration session.

6. The method according to claim 5, wherein:
the operations include one or more of editing, sharing, and annotating.

7. The method according to claim 1, further including:
updating the FUNC descriptors with annotations inputted by another user.

8. A system for providing desired application usage experience to a user on a user device, comprising:
a processor and a memory coupled to the processor, the memory storing a plurality of program modules executed by the processor, the plurality of program modules comprising:
a FUNC descriptor module;
a page-FUNC module configured to automatically convert a plurality of App pages into FUNC descriptors to be stored in the FUNC descriptor module, wherein each FUNC descriptor of an FUNC includes at least non-functional properties of the FUNC, capability of the FUNC, and an interface of the FUNC to invoke the FUNC; and
a FUNC recommender configured to:
obtain at least one user intention inputted by the user;
determine at least one FUNC descriptor from the FUNC descriptors stored in the FUNC descriptor module for fulfilling the user intention;
recommend to the user with at least one FUNC corresponding to the at least one FUNC descriptor by rendering the at least one FUNC descriptor on the user device; and
invoke the at least one FUNC directly from the user device without going through a launching page of an App page providing the at least one FUNC; and
a FUNC repurposer configured to repurpose the at least one FUNC descriptor based on preference of the user and characteristics of the user device, and render the at least one FUNC descriptor on the user device based on repurposing of the at least one FUNC descriptor, comprising:
using an estimation (EST) of effort that the user makes to use the at least one FUNC to establish an underlying mechanism for the repurposinq, wherein:

$$EST(R(F), DU) = \sum_{e \in F} M(R(e), D, U) + N(R(e), D, U)$$

wherein M is a match cost that measures how appropriate each widget is for consuming an information of a FUNC element, N is a navigational cost that estimates an extra user effort required to manipulate the widget, F is the FUNC element, R is a rendering of the FUNC element (F) and is a trader off of two factors, M and N of using the rendering, giving a device (D) and a user (U).

9. The system according to claim 8, wherein the repurposing is performed based on an estimation of effort that the user makes to use the FUNC including a match cost and a navigational cost.

10. The system according to claim 8, wherein:
the capability includes at least one or more of shared variables, pre-condition, assumption, postcondition, and effect.

11. The system according to claim 8, wherein:
the interface includes communication information to realize one or more FUNCs corresponding to the FUNC descriptor and cooperation with other FUNCs.

12. The system according to claim 8, further including:
a FUNC collaborator configured to:
receive a request from the user for a collaboration session to enable other users to operate on the FUNC descriptor jointly;
make a copy of the FUNC descriptor for each user included in the collaboration session; and
synchronize the copy of the FUNC descriptor for each user to reflect all operations made by all users in the collaboration session.

13. The system according to claim 12, wherein:
the operations include one or more of editing, sharing, and annotating.

14. The system according to claim 8, further including:
a FUNC annotator configured to update the FUNC descriptors stored in the FUNC descriptor module with annotations inputted by another user.

* * * * *